United States Patent Office 3,283,133
Patented Nov. 1, 1966

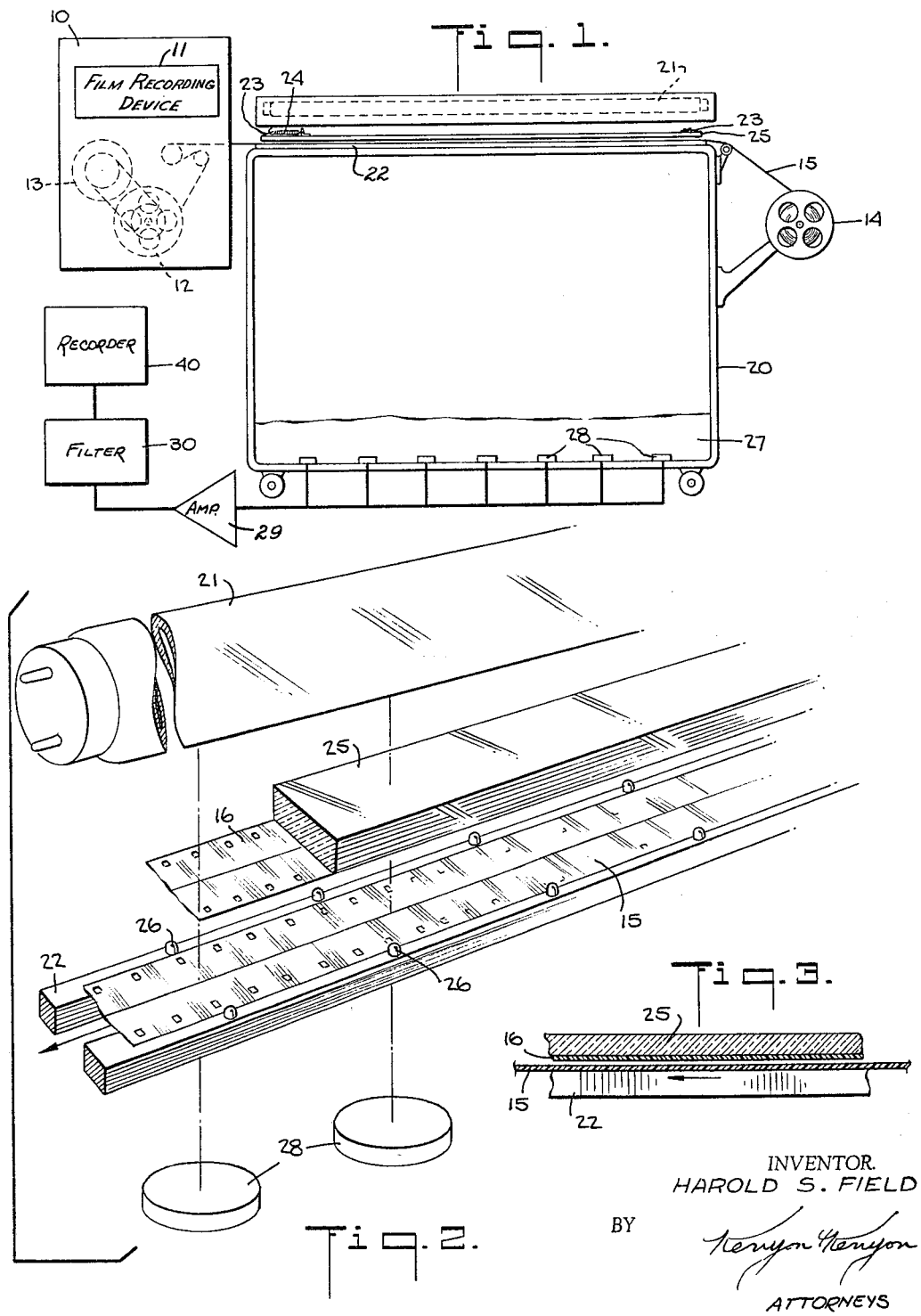

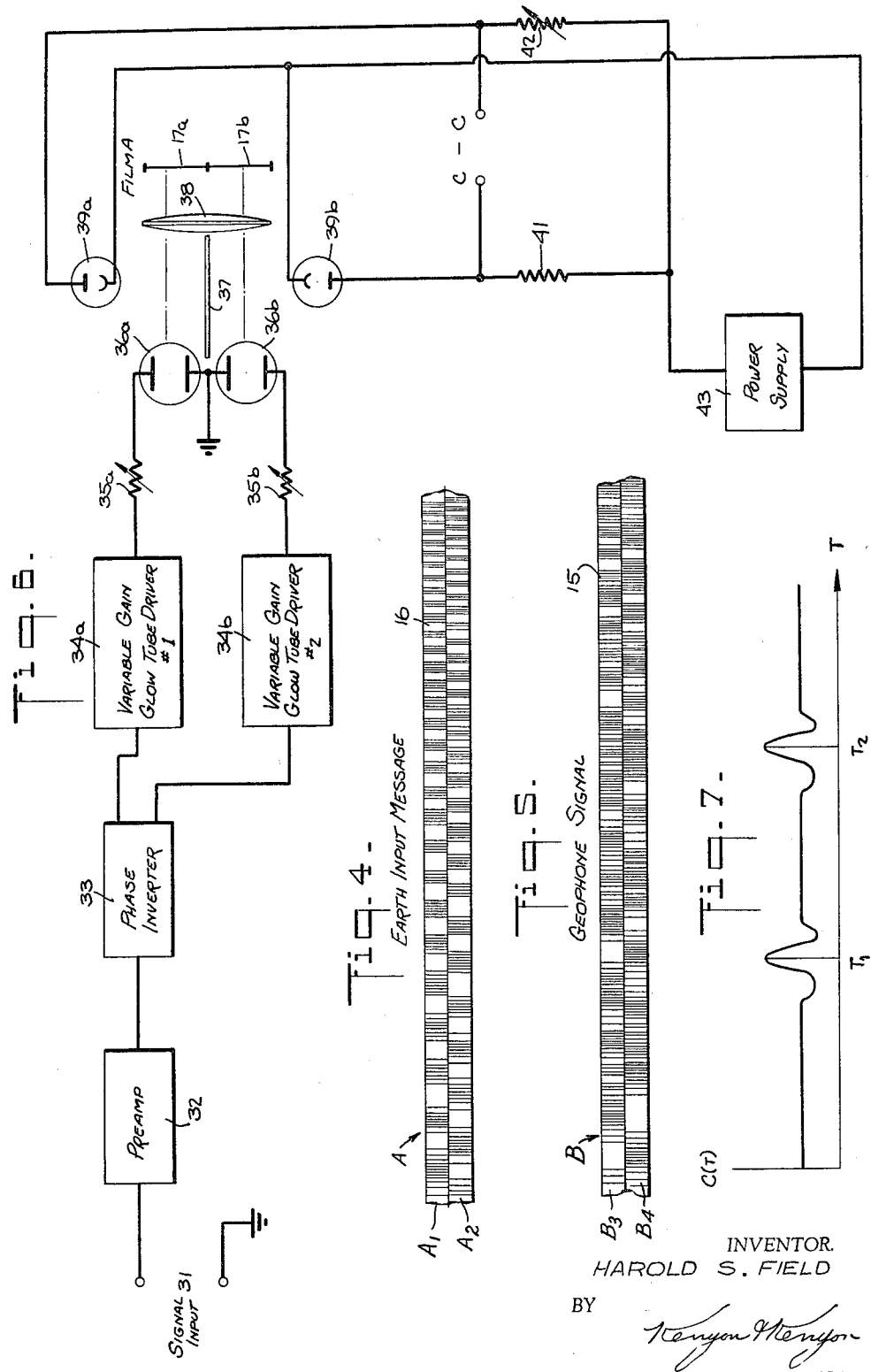

3,283,133
METHOD AND APPARATUS FOR THE OPTICAL CROSS-CORRELATION OF TWO FUNCTIONS
Harold S. Field, Tulsa, Okla., assignor to Geophysical Research Corporation, New York, N.Y., a corporation of New Jersey
Filed Jan. 9, 1963, Ser. No. 250,309
7 Claims. (Cl. 235—181)

This invention relates to techniques and apparatus for the cross-correlation of wave forms and particularly to the use of such techniques and apparatus in conjunction with seismic reflection prospecting.

The application of sonic energy to the earth and the reception and recording of the reflections of such energy from various strata beneath the ground is well known to those skilled in the art of seismic reflection prospecting.

This invention is particularly applicable when the sonar energy input or "shot" is in identifiable form, such as a variable frequency signal rather than an explosive.

The invention contemplates the preparation of variable density film representations of seismic traces in which the amplitude of the trace is represented by a greater or lesser shade of obscurity, such as the background degree of capacity, of the film.

The invention then provides for the cross-correlation of the film representing the "shot" or input of energy, with that representing the "reflection" or energy received, and the recording of the cross-correlation function so as to determine the time interval between vents, the depths of reflecting strata, and so forth.

Since the operation of cross-correlation, as defined below, requires the multiplication and integration of the two functions or traces, the analog device provided must be able to multiply and integrate.

According to the invention these functions are performed optically by placing the variable density film strip of the "shot" in a fixed relation before a light source, moving a second film strip of "reflections" over the fixed film strip, collecting the light transmitted through both strips by the use of photoelectric cells and recording the variation in light passing through both strips. Thus a function of cross-correlation with respect to time is recorded. When the cross-correlation between the strips of "shot" and "reflection" indicates a maximum, it may be assumed that a reflection has occurred, and the time interval between the two events may be determined.

It is an object of this invention to provide apparatus and methods for the cross-correlation of two functions, such as two seismographic record traces.

It is a further object of this invention to provide a simple and efficient method for quickly determining the time interval between a "shot" and the reception by geophones of various reflections.

Still another object is to provide methods and apparatus for preparing a film strip upon which is stored a visual representation of seismic traces or other wave forms to be cross-correlated.

Still a further object is to provide apparatus for the preparation of dual track variable density film representations of a seismic trace or other wave form.

Yet another object is to provide efficient and inexpensive apparatus and methods for optically cross-correlating two functions, using dual track variable density film representations of said functions, so as to obtain a record of their cross-correlation with respect to time.

Further objects and features of this invention will become apparent from a reading of the following description and by reference to the appended drawings in which:

FIG. 1 is a schematic diagram of the apparatus for the performance of the method according to the invention.

FIG. 2 shows the relationship between light source, film strips and photoelectric cells in practicing the method of the invention.

FIG. 3 shows the relationship between the moving and fixed film strips shown in FIG. 2.

FIG. 4 shows a double track variable density film strip representing an earth input message or "shot".

FIG. 5 shows a double track variable density film strip representing a geophone signal or "reflection".

FIG. 6 is a schematic diagram of a film recording device which may be used in conjunction with this invention, including a bridge circuit.

FIG. 7 is a graphical representation of the cross-correlation function of a typical "shot" and "reflection" as recorded at the output.

*Description of the structure of the system*

Referring now to the drawings, FIG. 1 shows all of the elements of the system schematically.

Film recording assembly 10 includes film recording device 11, the film-making structure of which is shown in FIG. 6, and a take-up reel 12 actuated by synchronous motor 13.

A variable density film strip 15, as shown in FIG. 5, representing the wave form to be cross-correlated, such as the reflection, is fed through light table 20 to take-up reel 12 by supply reel 14.

Light table 20 is provided with a long fluorescent tube 21 which overlies the length of upper aperture or film track 22 of integration chamber 27.

A transparent block 25 fits between tube 21 and track 22 and is provided with film clips 23 to receive and hold a fixed strip of film 15. Tension may be maintained by using a spring 24 with one of said film clips 23. Film track 22 is fitted with guide pins 26 along both sides of its length so as to hold and guide moving strip 15, and to permit its removal from said track.

Fixed film strip 16, as shown in FIG. 2 and FIG. 4 which is attached to transparent block 25 and situated between bulb 21 and track 22, is a variable density film reperesentation of the standard wave form against which the moving strip 15 is to be cross-correlated, as for example, a "shot" wave form.

Integration chamber 27 (FIG. 1) is a rectangular box-like compartment. It is painted optical white so as to assure collection of all light rays entering through aperture or film track 22, and not merely direct rays from fluorescent bulb 21. Across the bottom of integration chamber 27 are disposed a plurality of photocells 28. These cells are arranged and adjusted so that each produces the same ouput when no film lies across rectangular aperture or track 22. Thus the photocell output is adapted to chamber geometry.

FIG. 1 illustrates the physical relationship between bulb 21, film strips 15 and 16 and photocells 28.

In a typical light table according to the invention, the fluorescent tube 21 and its associated chamber 27 may be in the nature of 36 to 42 inches in length. The fluorescent bulb 21 is operated from a transistor oscillator at 3,000 cycles per second, and the D.C. voltage to the oscillator is well regulated. The bulb may be provided with a 6 volt supply to its heater, and a high voltage pulse may be placed across the first two inches on one extremity of the tube in order to start the discharge.

The fluorescent lamp may be operated at some frequency other than 3,000 cycles, or with direct current. The frequency chosen must lie well outside the band of frequencies represented by the functions being correlated, so that fluctuations in the light intensity may be filtered out of the correlation output.

Operable apparatus may be constructed with various lengths of bulb 21 and light table 20, ranging from a few inches to a few feet. Conservation of space is a major consideration but longer tables reduce the effects of distortion due to film tension, speed variations, mechanical noises and other factors.

The photocells 28 located at the bottom of the integration chamber 27 may be of the selenium variety. In the typical light table mentioned above, seven selenium cells would be adequate to perform the integrating function.

The output portion of the system is also shown schematically in FIG. 1. The output of photocells 28 is passed through amplifier 29 and fed through filter 30 which eliminates the 3,000 cycle noise created by the fluorescent bulb 21. Filter 30 may be either a standard M derived filter eliminating all frequencies over 1,000 cycles, or it may be a demodulator, eliminating such frequencies.

The filtered signal, representing the cross-correlation function of the two functions represented upon the film strips, is then recorded, as on a seismic recording camera 40, as shown in FIG. 7.

In FIG. 6 a schematic diagram shows the circuitry for a film recording device 11 designed to prepare dual track variable density film representations of the seismic trace or other wave form input.

The film recording device may be provided with a preamplifier 32 to adjust the input signal to an appropriate level for application to phase inverter 33.

As shown in FIG. 6, the input signal may be applied at 31, as by transformer coupling, to preamplifier 32. The preamplified signal is then applied to phase splitter or phase inverter 33. Outputs are taken, which are 180° out of phase, and applied to variable gain glow tube drivers 34a and 34b which are coupled by variable resistors 35a and 35b to their respective glow tubes 36a and 36b. These drivers may be pentode amplifier circuits provided with cathode resistors and variable gain grid resistors for the A.C. balancing purposes to be described below. The film A is divided into two tracks, 17a and 17b, by baffle 37 which permits the light of each glow tube to reach only its own portion of film A through collimating lens 38.

Photocells 39a and 39b are provided adjacent to lens 38 to assure balanced glow tube output, as will be explained below.

FIG. 6 also shows a D.C. balancing bridge circuit which may be used to equalize the light output of the glow tubes 36a and 36b when no signal is applied. The bridge includes two photo-resistors or photocells 39a and 39b, referred to above, a fixed resistor 41 and a variable resistor or trimmer potentiometer 42, arranged about null points C—C. A single regulated power supply 43 may be used to energize both the bridge of FIG. 3 and the camera of FIG. 2.

Of course, a single track variable density film representation might be prepared by exciting only one glow tube, e.g. tube 36a, and eliminating baffle 37 and the other glow tube 36b.

*The operation of the system*

The functions performed by particular elements of the system can be better grasped after a definition of cross-correlation is given, and the necessary operations to be performed are understood.

The mathematical definition of the cross-correlation of two functions of time, $f(t)$ and $g(t)$, such as two seismographic record traces, may be written:

$$C(T) = \int F(t) \cdot g(t-T) \cdot dt \qquad (1)$$

Where the integration is to be performed over the entire range of values of $t$ for which $f$ and $g$ are not negligibly small as shown by (1) the cross-correlation C is a function of T delay time, which we purposely introduced into the argument of either $f$ or $g$. $C(T)$ may be plotted as a function of T and various conclusions can be drawn from such a graph, as in FIG. 7. For example, when $C(T)$ is at a maximum, as at $T_1$, we can assume that a reflection has been received. Obviously, where a seismographic trace is concerned, a number of peaks, $T_1$, $T_2$, etc., representing reflections are possible.

As may be seen from (1) an analog device performing the function of cross-correlation must be capable of multiplying and integrating, and if $C(T)$ is to be given for more than one instant, the device must also be capable of displacing the two seismographic traces relative to one another, and keeping a continuous record. If the speed of displacement is related to the speed at which the traces were recorded, and the two traces are marked or "keyed" with respect to the instant the "shot" was initiated, the delay time, T, will be a measure of the interval between shot and reflection. A fiducial pulse may be recorded on each strip of film for this purpose.

Multiplication and integration are effected by the apparatus described above, in the following manner.

The intensity of light transmitted by an exposed photographic film may be made to vary along its length as some predetermined function, by preparing a variable density film recording of such function, as shown in FIG. 5. Two such film strips, 15 and 16, representing the "shot" and "reflections" may be prepared.

If light is passed through the two strips of film, its intensity is proportional to the product of the transmission factors of the two strips. As the variable density recordings 15 and 16 are controlled respectively by $f$ and $g$, the product $f \cdot g$ needed in (1) is formed.

Thus in the apparatus shown in FIG. 1, fixed film strip 16, corresponding to the "shot," is attached to transparent block 25. Moving strip 15, corresponding to seismic "reflections" is connected to take-up reel 12 and inserted in film track 22, where it is secured by transparent block 25. Thus film strips 15 and 16 overlie each other on film track 22 and light from fluorescent bulb 21 is transmitted through both films to integration chamber 27, as shown in FIG. 2.

Integration is performed by collection of the transmitted light along the entire length of the film track 22 by photocells 28 at the base of chamber 27.

Moving strip 15 is displaced with respect to fixed strip 16 by running strip 16 through film track 22 at a speed governed by synchronous motor 13 of camera assembly 10. This displacement accordingly corresponds to the delay time T.

The output of these photocells is filtered 30 and recorded 40, as shown in FIGS. 1 and 7, and represents the cross-correlation function $C(T)$ defined in (1).

From recordings of the cross-correlation function $C(T)$, as shown in FIG. 6, the time intervals between "shot" and various reflections, and consequently the depths of various strata, as well as other geological information, may be obtained.

Certain advantages arise if dual track variable density film recordings are used rather than single track recordings.

Double track films A and B, as shown in FIGS. 4 and 5, may be prepared corresponding to two functions $f$ and $g$. Strip A comprises tracks A1 and A2 and strip B comprises B3 and B4.

The transmissions of A1 and A2 are made proportional respectively to:

$$a+f(t) \text{ and } a-f(t) \qquad (2)$$

and the transmissions of B3 and B4 are made proportional to:

$$b+g(t) \text{ and } b-g(t) \qquad (3)$$

where $a$ and $b$ are the zero or reference levels of obscurity, such as the background degree of opacity, of each film strip.

When the two strips overlie each other, as in track 22, A1 is in contact with B3 and A2 is in contact with B4, and the transmissions are the respective products of the factors in (2) and (3).

Thus A1 and B3 produce:

$$ab + bf + ag + fg \qquad (4)$$

and A2 and B4 produce:

$$ab - bf - ag + fg \qquad (5)$$

It is seen that the total light transmitted through both tracks is the sum of (4) and (5), namely:

$$2ab + 2fg \qquad (6)$$

By integrating the light transmitted we obtain:

$$2\int ab \cdot dt + 2\int f \cdot g \cdot dt \qquad (7)$$

So long as there is no time variations in $a$ and $b$, the reference levels of the film strips, it is seen that the output collected by photocells 25 at any instant T is a constant determined by reference levels $a$ and $b$, plus a multiple of the desired cross-correlation function, $C(T)$.

However, if a single track system is used, the transmission of tracks A and B will be $a+f(t)$, and $b+g(t)$ respectively, and the transmission product will be:

$$ab + bf + ag + fg \qquad (8)$$

Upon integration, it is seen that unless $f(t)$ and $g(t)$ have zero average value, $a$ and $b$ are constant along the entire length of the strips, the light source is uniform and the photocells are uniformly sensitive, the terms $bf$ and $ag$ will not be eliminated and distortion of the desired product $C(T) = \int f \cdot g \cdot dt$ will result.

A comparison of expressions (6) and (8) therefore shows that a dual track system operates to eliminate two time-dependent factors $bf(t)$ and $ag(t)$, greatly simplifying the requirements of the system and improving its efficiency.

It is noteworthy that these advantages are retained even if the two strips A and B are inappropriately juxtaposed so that A1 overlies B4 and A2 overlies B3. Time-dependent factors $bf(t)$ and $ag(t)$ would still be eliminated, but reflections would be noted at minima rather than maxima of the cross-correlation function $C(T)$.

Dual track variable density film may be prepared by use of a camera 11, as shown in FIG. 2 and described above.

The wave form or signal to be recorded $f(t)$ is applied to the input 31 of film recording device 11. The signal is then preamplified, if necessary, and applied to a phase inverter 33, from which the out of phase outputs are coupled to the driving amplifier circuits 34a and 34b of each glow tube. These signals are then applied through variable resistors 35a and 35b to glow tubes 36a and 36b. It is seen that the light output of these glow tubes is proportional to $a+f(t)$ and $a-f(t)$ respectively, where $a$ is the reference level or "no-signal" brightness.

To assure that the reference level is uniform and at the desired intensity, the balanced photocells 39a and 39b of the bridge circuit shown in FIG. 3 may be provided adjacent to collimating lens 21a, and the following procedure may be used.

First, the D.C. bridge of FIG. 6 is balanced by illuminating photocells 39a and 39b from the same light source, properly positioned, and adjusting trimmer potentiometer 42. Next, the average current through the glow tubes is adjusted, so as to give the desired reference level brightness $a$. Then, the balanced bridge may be used to equalize the light emitted by each glow tube 39 when no signal is applied. This is done by adjusting resistors 35a and 35b until the voltage across null points C—C is zero.

A.C. balance is achieved by applying an A.C. signal at 31 and adjusting the gain control of drivers 34a and 34b until equal A.C. voltages are measured across their cathode resistors, not shown.

Once the system is adjutsed, film is driven before glow tubes 36a and 36b by a synchronous motor 13, which may be the same motor used during the cross-correlation process for running the film through film track 22 of light table 20. In the typical system described, the film was driven over the light table at a speed of five inches per second by such a motor.

Thus, according to the above description, single and double track variable density film strip representations of two functions may be prepared, cross-correlated optically, and recorded. Numerous applications of such a system to wave form comparison and identification, data retrieval, and other uses in addition to seismic reflection prospecting suggest themselves, and while preferred embodiments of the invention have been disclosed, it is to be clearly understood that changes and modifications in the apparatus and methods described may be made, without departure from the concept and spirit of the invention, and from the scope of the following claims.

What is claimed is:

1. The method of optically cross-correlating two functions comprising preparing two dual track variable density film strip representations, each of said strips having a first and second track relating to a different one of said functions with the corresponding portions of the first and second tracks as defined by the function being aligned with respect to one another, each of said strips having the density of the first track in direct proportion to and the density of a second track in inverse proportion to a different one of said functions, placing said film strips in overlying relation, passing light through said overlying film strips, moving one of said film strips over the other while in said overlying relation, and recording the light transmitted through said strips during said motion, as a function of the relative displacement between said strips.

2. In a method of cross-correlating two functions comprising the steps of preparing an optical representation of each of said functions, preparing an additional optical representation of the inverted phase of each of said functions, said optical representation and said additional optical representation of each of the functions being recorded on a recording medium having two tracks, positioning the optical representation and the additional optical representation of one of the functions with the corresponding portions of the optical representation and the additional optical representation as defined by the other function in alignment with respect to one another, moving the positioned representation and the additional representation of each of the different functions with respect to one another, multiplying the representation and the additional representation of one of said functions with the representation and the additional representation of the other of said functions, and integrating the product of said step of multiplying, said integrated product corresponding to the cross-correlation of said functions.

3. In a method of cross-correlating two functions comprising the steps of preparing a variable density film representation of each of said functions, preparing an additional variable density film representation of the inverted phase of each of said functions, said variable density film representation and said additional variable density film representation of each of the functions being recorded on a film medium having two tracks positioning said film representation and said additional film representation of one of the functions with the corresponding portions of the film representation and the additional film representation as defined by the other function in alignment with respect to one another, passing light through said film representation and said additional film representation of one of said functions and through said film representation and said additional film representation of the other of said function while held in an overlying relationship, moving said positioned film representation and said additional film representation of each of the different functions with respect to one another, and recording the quantity of light transmitted through said representations and said additional representations.

4. A method of cross-correlating two functions comprising the steps of preparing a variable density film representation of each of said functions, preparing an additional variable density film representation of the inverted phase of each of said functions, said variable density film representation and said additional variable density film representation of each of the functions being recorded on a film medium having two tracks, positioning said film representation and said additional film representation of one of the functions with the corresponding portions of the film representation and the additional film representation as defined by the other function in alignment with respect to one another, passing light through said film representation and said additional film representation of one of said functions and through said film representation and said additional film representation of the other of said functions while held in an overlying relationship, moving said film representations and said additional film representations with respect to one another while in said overlying relationship, and recording the quantity of light transmitted therethrough as a function of the relative displacement between said film representations and said additional film representations.

5. Apparatus for cross-correlating two functions by use of an optical representation of each of said functions and an additional optical representation of the inverted phase of each of said functions, said optical representation and said additional optical representation of each of the functions being recorded on a recording medium having two tracks, the optical representation and the additional optical representation of one of the functions being positioned with corresponding portions of the optical representation and the additional optical representation as defined by the other function and aligned with respect to one another, said apparatus comprising means for moving said positioned optical representation and said additional optical representation of each of the different functions with respect to one another, means for optically multiplying the representation and the additional representation of one of said functions with the representation and the additional representation of the other of said functions, and means for integrating the product of said optically multiplying means, said integrated product corresponding to the cross-correlation of said functions.

6. Apparatus for cross-correlating two functions by the use of a variable density film representation of each of said functions and an additional variable density film representation of the inverted phase of each of said functions, said variable density film reprsentation and said additional variable density film representation of each of the functions being recorded on a film medium having two tracks, the film representation and the additional film representation of one of the functions being positioned with corresponding portions of the film representation and the additional film representation as defined by the other function and aligned with respect to one another, said apparatus comprising means for passing light through said film representation and said additional film representation of one of said functions and through said film representation and said additional film representation of the other of said functions while held in an overlying relationship, means for moving the positioned film representation and the additional film representation of each of the different functions with respect to one another, and means for recording the quantity of light transmitted through said representations and said additional representations.

7. An apparatus for cross-correlating two functions by the use of a variable density film representation of each of said functions and an additional variable density film representation of the inverted phase of each of said functions, said variable density film representation and said additional variable density film representation of each of the said functions being recorded on a film medium having two tracks, the film representation and the additional film representation of one of the functions being positioned with corresponding portions of the film representation and the additional film representation as defined by the other function and aligned with respect to one another, said apparatus comprising means for passing light through said film representation and said additional film representation of one of said functions and through said film representation and said additional film representation of the other of said functions while held in an overlying relationship, means for moving one of said film representation and said additional film representation over the other while in said overlying relationship, and means for recording the quantity of light transmitted therethrough as a function of the relative displacement between said film representaions and said additional film representations of each of said functions.

References Cited by the Examiner

UNITED STATES PATENTS

| | | | |
|---|---|---|---|
| 2,919,425 | 12/1959 | Ress et al. | 340—146.3 X |
| 2,963,542 | 12/1960 | Blackstone | 178—6.7 |
| 3,030,021 | 4/1962 | Ferre | 235—181 |
| 3,085,226 | 4/1963 | Brown | 340—146.3 |
| 3,092,687 | 6/1963 | Cannon | 178—6.7 |
| 3,111,666 | 11/1963 | Wilmotte | 343—13 |
| 3,157,874 | 11/1964 | Altar et al. | 235—181 X |

MALCOLM A. MORRISON, *Primary Examiner.*

I. KESCHNER, *Assistant Examiner.*